Figure 1:
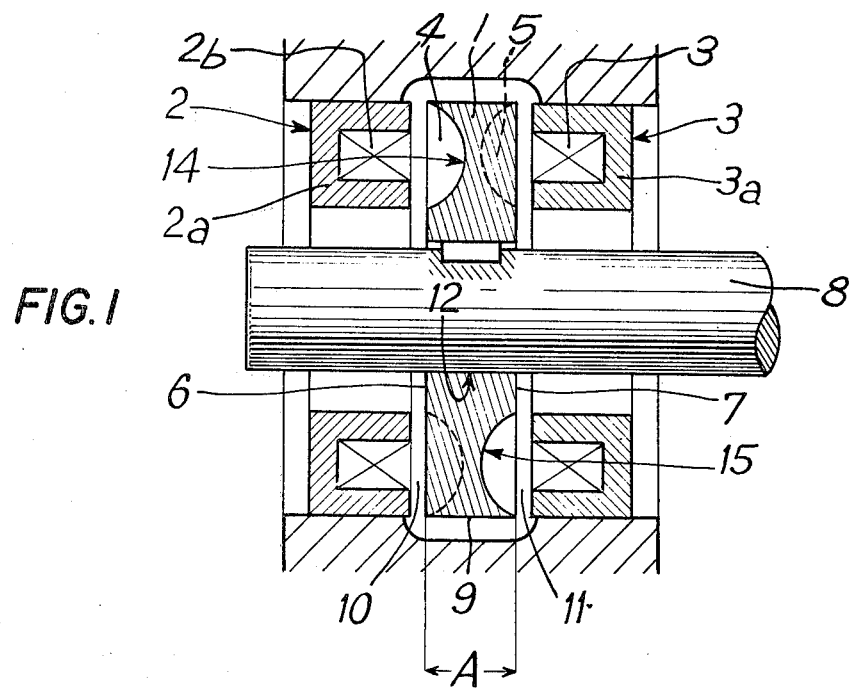

United States Patent [19]

Habermann

[11] 4,180,296

[45] Dec. 25, 1979

[54] AXIAL ELECTROMAGNETIC BEARING FOR A SHAFT ROTATING AT HIGH SPEED

[75] Inventor: Helmut Habermann, Vernon, France

[73] Assignee: Societe Europeenne de Propulsion, Puteaux, France

[21] Appl. No.: 867,381

[22] Filed: Jan. 6, 1978

[51] Int. Cl.² ............................................. F16C 39/00
[52] U.S. Cl. .................................................... 308/10
[58] Field of Search .......................... 308/10; 310/268

[56] References Cited

U.S. PATENT DOCUMENTS

| | | | |
|---|---|---|---|
| 2,550,571 | 4/1951 | Litman | 310/268 |
| 3,230,406 | 1/1966 | Henry-Baudot | 310/268 |
| 3,746,407 | 7/1973 | Stiles | 308/10 |
| 3,779,618 | 12/1973 | Soglia | 308/10 |
| 3,929,390 | 12/1975 | Simpson | 308/10 |

Primary Examiner—R. Skudy
Attorney, Agent, or Firm—Eyre, Mann, Lucas & Just

[57] ABSTRACT

An axial electromagnetic bearing for supporting the end of a shaft rotating a high speed of the type comprising an armature in the form of a disc attached to the shaft and a fixed annular armature disposed facing the disc armature a short distance from the former so as to define a small axial air gap therebetween, the said fixed armature comprising excitation windings and a ferromagnetic core, the bearing being characterized in that radial grooves are provided in the peripheral portion of the disc and situated facing the annular fixed armature.

The arrangement causes a reduction in the effect of Eddy currents without detracting from the mechanicl strength of the bearing.

6 Claims, 2 Drawing Figures

U.S. Patent  Dec. 25, 1979  4,180,296

AXIAL ELECTROMAGNETIC BEARING FOR A SHAFT ROTATING AT HIGH SPEED

The present invention to an electromagnetic bearing for supporting the ends of rotors rotating at high speeds of the type which comprises a disc armature integral with the rotor and an annular fixed armature located at a small distance from the disc armature in such a manner that a small axial air gap is formed, the said fixed armature comprising exication windings and a ferromagnetic core.

The mounting of a shaft rotating with the assistance of axial and/or radial electromagnetic suspension has a number of advantages in that friction is suppressed and the inertia and the rigidity of the shaft can be increased since the electromagnetic suspension is not affected by the diameter of the shaft. Accordingly, vibration is reduced at high speeds. In addition, the control of electromagnetic bearings with the help of detectors for the positioning of the shaft enables the shaft to be maintained in position against axial and/or radial displacement forces.

The operation of axial electromagnetic bearings poses, however, a certain number of problems. In effect, the disc armature, which constitutes the rotor of the bearing, rotates at a very high speed and cannot be made of a laminated material because the mechanical strength would be too weak. Accordingly, large Eddy currents are induced in the interior of the body of the disc and these cause damping which lead to a limitation in the pass band of the associated control.

It has been proposed, to reduce the size of the Eddy currents that radial slots be cut in the periphery of the disc in the form of teeth. Such an arrangement certainly reduces Eddy currents but the cut-away portions lead to too great a reduction in the mechanical strength. In effect, at high rotational speeds, the exagerated stress appearing at the root of the teeth can cause rupturing of the disc.

The object of the present invention is to remedy the aforementioned inconveniences and notably to reduce the Eddy currents appearing in the disc of an axial electromagnetic bearing without causing a notable diminution of the mechanical strength of the said disc.

According to the present invention there is provided an axial electromagnetic bearing for supporting the end of a shaft rotating at high speed comprising an armature in the form of a disc attached to the shaft and an annular fixed armature located, in relation to the former, a short distance therefrom to define a small axial air gap therebetween, the said fixed armature comprising excitation windings and a ferromagnetic core, and the bearing being characterised in that radial grooves are provided in the peripheral portion of the disc armature facing the fixed armature.

Thus, these radial grooves cut the Eddy currents from which it follows that the damping and thus the weakening of the control of the axial bearing are reduced. Moreover, the mechanical strength of the disc integral with the rotating shaft magnetically suspended is not substantially reduced and the disc can withstand high rotational speeds. In effect, the thickness of the disc is reduced in localised zones but there is no discontinuity in the edge of the disc.

Preferably, the said grooves are regularly spaced in the said peripheral portion of the disc armature.

In one particular embodiment of the invention, when the axial bearing comprises a disc armature disposed between two fixed annular armatures, the radial grooves are provided in the two faces of the disc in the peripheral portion thereof facing the annular armatures.

Preferably, the radial grooves provided in each of the faces of the disc are regularly spaced and out of phase in relation to the grooves provided in the opposite face of the disc.

Preferably also, each groove in each face of the disc is disposed an equal distance from the two nearest grooves situated on the opposite face of the disc.

The grooves permit a maximum efficiency to be attained when they are out of phase by a half cycle, that is to say when each groove on one face of the disc is diametrically opposite to a groove on the other side of the disc.

Figure 2:
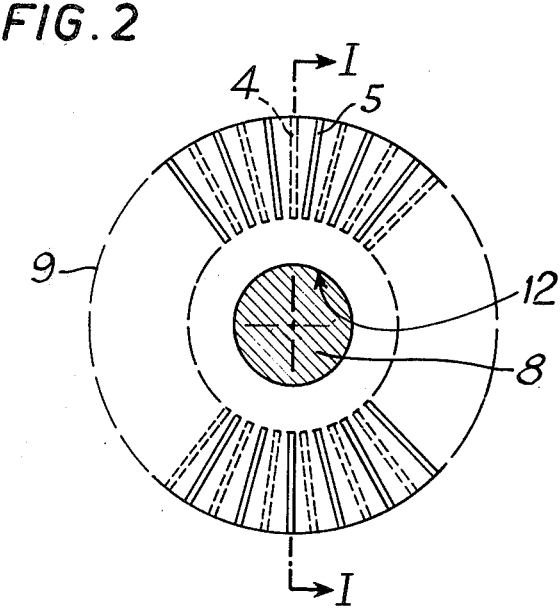

The present invention will now be described by way of example with reference to the accompanying drawing in which:

FIG. 1 is a cross section on the line I—I of FIG. 2 showing a bearing according to the invention; and FIG. 2 is a side view of a disc forming the rotor armature of the axial bearing of FIG. 1.

As can be seen in FIG. 1, a disc 1 comprises the rotor armature of an electromagnetic axial bearing. The disc 1 is located between two annular stator armatures 2 and 3 comprising respectively a ferromagnetic core 2a, 3a and excitation windings 2b, 3d. The disc 1, integral with a rotating shaft 8, has two front faces 6 and 7 and an end face 9. Grooves 4 and 5 respectively are provided in the faces 6 and 7 of the disc 1 in the peripheral portion thereof situated facing the annular stator armatures 2 and 3 respectively. As can be seen in FIG. 2, the radial grooves 4, 5 respectively are regularly spaced at the periphery of the disc 1 and the grooves in one of the faces are out of phase in relation to the grooves provided in the opposite face. Preferably, each groove 4, 5 on each face 6, 7 of the disc 1 is located an equal distance from two grooves 5, 4 which are situated the nearest to it on the opposite face 7, 6 respectively.

As shown in FIG. 1, each groove 4, 5 respectively of a face 6, 7 respectively of the disc 1 is diametrically opposite a groove 5, 4 respectively on the opposite face 7, 6 of the disc 1. Thus, the grooves of one of the faces are out of phase by a half-cycle in relation to the grooves of the other face.

The rings 2a, 3a comprising the ferromagnetic core of the stator armature 2,3 and which are coaxial to the shaft 8 can be made in one piece but are preferably made of bundles of isolated laterally disposed sheets or of laminated iron sheets in order to reduce the heating of the electromagnetic portions and the loss caused by Eddy currents.

The air gaps 10 and 11 between the stator armatures 2 and 3 respectively and the disc armature 1 of the axial electromagnetic bearing are controlled and regulated with the help of axial detectors, not shown, in relation to the axial position of the shaft 8. These axial detectors regulate the excitation of the axial bearing in such a manner as to maintain constantly the air gaps 10 and 11.

The disc 1 can be formed with an aperture 12 at its centre and be mounted coaxially on the shaft 8, as shown in FIGS. 1 and 2, or can comprise an abutment on the shaft 8 in the fashion of the horizontal cross-piece of a T-shape.

It is to be noted that, in accordance with the present invention, the end face 9 of the disc 1 is not cut and always has a thickness or width A. The thickness of the disc 1 is only reduced at the level of the grooves 4 and 5 with respect to the end face 9 of the disc 1. The grooves 4 and 5 can have different configurations but advantageously the profile of the bottom 14, 15 of the grooves 4, 5 is curved so that the forming of the grooves is facilitated and the efficiency can be the greatest possible with relation to a removal of the least material and so that the profile of the grooves can correspond substantially to the field lines of the induced magnetic field.

As is well known, diverse modification and additions can be made by persons skilled in the art to the apparatus which is described above strictly by way of non-limiting example without limiting the scope of protection of the invention.

I claim:

1. An axial electromagnetic bearing for supporting the end of a shaft rotating at high speed comprising an armature in the form of a disc attached to the shaft and an annular fixed armature located, in relation to the former, a short distance therefrom to define a small axial air gap therebetween, the said fixed armature comprising excitation windings and a ferromagnetic core, and the bearing being characterized in that radial grooves are provided in the peripheral portion of the disc armature facing the fixed armature, the spacing of said radial grooves being effective to reduce eddy currents when said shaft is rotated at high speed.

2. A bearing as claimed in claim 1 characterised in that the said grooves are regularly spaced in the said peripheral portion of the disc armature.

3. A bearing as claimed in claim 1 in which the disc armature is disposed between two fixed annular armatures, characterised in that the radial grooves are provided in the two faces of the disc in the peripheral portion of the disc facing the fixed armatures.

4. A bearing as claimed in claim 3 characterised in that the radial grooves provided in each of the faces of the disc are regularly spaced and out of phase in relation to the grooves provided in the opposite face of the disc.

5. A bearing as claimed in claim 4 characterised in that each groove in each face of the disc is disposed an equal distance from the two nearest grooves situated on the opposite face of the disc.

6. A bearing as claimed in claim 5 characterised in that each groove of one face of the disc is diametrically opposed to a groove in the opposite face of the disc.

* * * * *